Jan. 1, 1924. 1,479,698
J. CHOPPINET
SHUNT COIL FOR ELECTRIC METERS
Filed July 15, 1921
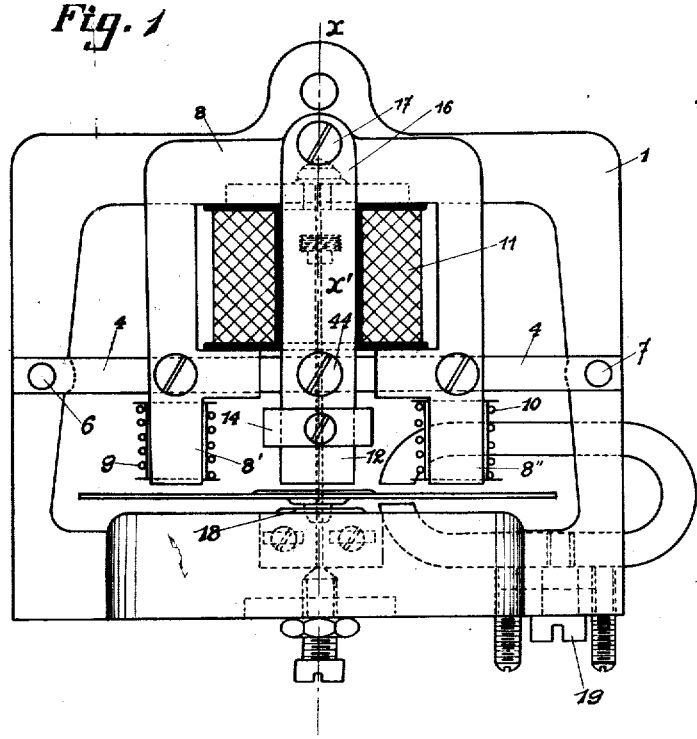
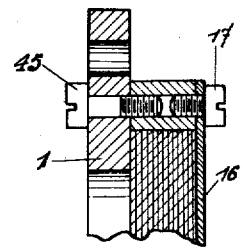
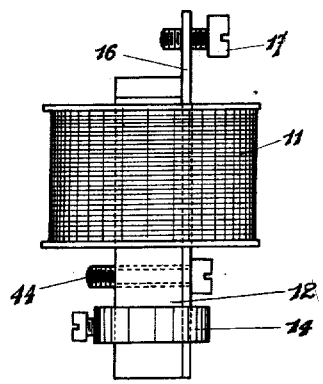
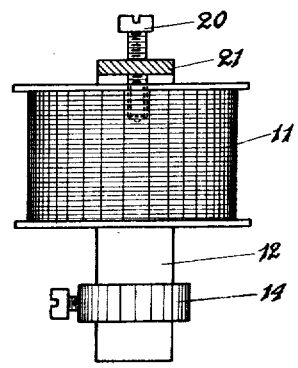
Inventor
J. Choppinet
By Marks + Clerk
Attys Patented Jan. 1, 1924.

1,479,698

UNITED STATES PATENT OFFICE.

JOSEPH CHOPPINET, OF BRUSSELS, BELGIUM.

SHUNT COIL FOR ELECTRIC METERS.

Application filed July 15, 1921. Serial No. 485,137.

*To all whom it may concern:*

Be it known that I, JOSEPH CHOPPINET, a subject of the King of Belgium, and resident of Brussels, Belgium, have invented certain new and useful Improvements in and Relating to Shunt Coil for Electric Meters; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

This invention relates to an arrangement of a voltage coil and magnetic core in such a manner that the parts may be readily disassembled.

This arrangement is intended for electric meters or induction wattmeters, and generally for apparatus working on the type of an induction electric motor according to Ferrari's principle.

In known apparatus of this kind, such as measuring apparatus of the wattmeter type for alternating single or polyphase current, the voltage coil and current coils are mounted on a common core having three arms generally consisting of laminated sheets of soft iron and cut in one piece, an armature rotating in front of them.

The current coils are mounted on the side arms, the voltage coil on the central arm, the latter is moreover provided at its lower part with members for adjusting the phase displacement.

When, owing to an accident, (which in fact happens quite frequently) such as an excess of voltage, lightning, dampness, shock, etc., a few turns of the voltage coil are burnt or damaged, the replacement of this coil requires a new adjustment, generally a complete one of the meter.

It is indeed impossible to take to pieces and to mount again a new voltage coil without taking to pieces at least those parts of the apparatus which are utilized for starting purposes and for adjusting the phase displacement through 90° which in fact involves a new general adjustment which is long and delicate, of all the members.

According to the present invention, the voltage coil and in some cases its core, may be immediately replaced without any of the members serving for any of the adjustments of the measuring apparatus being dismounted or put out of adjustment. To this end, the central core is made removable and the mounting of the voltage coil is such that it may be slid off, in case of damage thereto, and replaced by one which is calibrated and standardized according to each type of the apparatus.

The invention relates also to the means for the fixation of the core with its coil.

The accompanying drawings illustrate by way of example, the application of the invention to a single phase meter.

Fig. 1 is a view of a single-phase meter taken on the side of the field magnet.

Fig. 2 is a section along the line X X' of Fig. 1.

Figs. 3 and 4 illustrate by way of example two forms of construction of the core with the voltage coil.

Referring to the drawings, the meter comprises a frame 1 against which a horseshoe shaped core 8 provided at its ends 8' and 8'' with current coils 9 and 10 is fixed by means of screws 45 and of a transverse member 4 also screwed on to the said frame at 6 and 7.

The voltage coil 11 slides with slight friction upon its core 12 (see Fig. 3) and is held thereon at a suitable height owing to the fact that its height corresponds to the inside upper opening of the core 8. The core 12 is provided at its lower part with a ring 14 called a short circuit ring serving to adjust the phase displacement. At the upper part of the core, one of the sheet iron laminations having a suitable thickness and which constitutes the said core, has an extension shown at 16. A hole is provided in the said extension for receiving a screw 17 by means of which the core is fixed to the horse-shoe armature 8.

If the voltage coil 11 is damaged or rendered useless, the meter mechanism is removed from its casing (not shown) without interfering with any of the adjusting parts, and the screws 17 and 44 are removed and the whole of the core 12 and its coil 11 are withdrawn as a unit. After having subsequently withdrawn the coil from the core, a new coil exactly calibrated and standardized is slid thereon and said core 12 is replaced in the opening provided at the upper part of the core 8. The core 12 is screwed again and the meter is replaced in position without it being necessary to interfere with the adjusting ring 14 or with the adjusting plate of the motive couple 18 or with the adjustment 19 of the braking magnet. The extension 16 may be made of a magnetic or non-magnetic metal.

Other devices for fixing the removable core in operative position may be used, for instance, a right-angled fixation member, or a screw such as shown in Fig. 4.

As shown in Fig. 4, the core 12 is secured in place by means of a screw 20 which passes through an aperture provided in the core 8 and is threaded in the core 12. The said screw, which may be made of a magnetic metal passes through the core 8 and presses the core 12 against it.

In the case where it is desired magnetically to insulate the core 12 from the armature 8, the screw may be made of copper or any other non-magnetic metal. Moreover, if it is desired to allow a gap between the removable core 12 and the armature 8, a plate or nut 21 made of an insulating material or non-magnetic metal, would be inserted therein.

According to this invention, the delay and inconvenience formerly caused when replacing a defective voltage coil, owing to the necessity of readjusting the short circuit ring and other parts, are eliminated as, when such replacement is required, the core 12 is dismounted and a new voltage coil slid upon it for replacing the defective voltage coil. This operation does not require the removal of the horse-shoe armature, nor the displacement of the short circuit ring, either of which acts would obviously involve a new complete adjustment of the meter.

Claims:

1. In an instrument of the character described, a magnetizable core including three arms, a rotatable armature arranged adjacent said arms, a magnetizable keeper, current windings on certain of said arms, a voltage coil on another of said arms, and a short circuit ring on the last mentioned arm; said last mentioned arm being removable, together with said voltage coil to permit replacement of the latter.

2. In an electric instrument of the character described, a magnetizable core, arms carried by said core, one of said arms being removable, current windings carried by others of said arms, a rotatable armature associated with said magnetizable core, means to removably secure the removable arm to said magnetizing core, a short circuit ring carried by said removable arm, and a voltage coil removably mounted on said removable arm adapted to be replaced subsequent to the removal of said arm without interference of the adjustment of the instrument.

3. In an electric instrument of the character described, a magnetizable core, arms carried by said core, one of said arms being removable, current windings carried by other of said arms, a rotatable armature associated with said magnetizable core, means to removably secure the removable arm to said magnetizing core, a short circuit ring carried by said removable arm, a voltage coil removably mounted on said removable arm adapted to be replaced subsequent to the removal of said arm without interference of the adjustment of the instrument, and means to maintain said voltage coil in predetermined position with respect to the magnetizable core.

4. In an instrument of the character described, a magnetizable core including three arms, a rotatable armature arranged adjacent said arms, a magnetizable keeper, current windings on certain of said arms, a voltage coil on another of said arms, a short circuit ring on the last mentioned arm, said last mentioned arm being removable together with said voltage coil to permit replacement of the latter, an insulating and non-magnetic element interposed between the last mentioned arm and said magnetizable core, and means securing said last mentioned arm to said core.

In testimony whereof I affix my signature in presence of two witnesses.

JOSEPH CHOPPINET.

Witnesses:
GEORGES VAN DER HAEGHEN,
LEONARD LERA.